US006785883B1

(12) United States Patent
Slomak

(10) Patent No.: US 6,785,883 B1
(45) Date of Patent: Aug. 31, 2004

(54) SOFTWARE SYSTEM FOR TRACING DATA

(75) Inventor: Matthias Slomak, Wolfratshausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/889,644

(22) PCT Filed: Jan. 3, 2000

(86) PCT No.: PCT/DE00/00018
§ 371 (c)(1),
(2), (4) Date: Jul. 19, 2001

(87) PCT Pub. No.: WO00/43885
PCT Pub. Date: Jul. 27, 2000

(30) Foreign Application Priority Data

Jan. 19, 1999 (DE) ......................................... 199 01 879

(51) Int. Cl.[7] .............................................. G06F 9/44
(52) U.S. Cl. ........................ 717/128; 717/129; 717/126; 717/127; 717/130; 717/131; 717/139; 712/227; 712/233; 712/241; 714/34; 714/35
(58) Field of Search ................................ 717/128, 126, 717/127, 129, 130, 131, 139, 140; 712/227, 233, 234, 239, 241; 714/34, 35

(56) References Cited

U.S. PATENT DOCUMENTS

| 4,701,845 | A | * | 10/1987 | Andreasen et al. ............ 714/31 |
| 5,628,018 | A | * | 5/1997 | Matsuzaki et al. .......... 710/260 |
| 6,009,270 | A | * | 12/1999 | Mann .......................... 717/128 |
| 6,016,555 | A | * | 1/2000 | Deao et al. ..................... 714/35 |
| 6,112,298 | A | * | 8/2000 | Deao et al. ................... 712/227 |
| 6,145,123 | A | * | 11/2000 | Torrey et al. ................ 717/128 |
| 6,212,629 | B1 | * | 4/2001 | McFarland et al. .......... 712/241 |
| 6,230,313 | B1 | * | 5/2001 | Callahan et al. ............. 717/128 |
| 6,282,701 | B1 | * | 8/2001 | Wygodny et al. ............ 717/125 |
| 6,289,503 | B1 | * | 9/2001 | Berry et al. ................. 717/128 |

FOREIGN PATENT DOCUMENTS

| EP | 0 444 315 | 9/1991 |
| EP | 0 801348 | 10/1997 |
| EP | 0 822499 | 2/1998 |

OTHER PUBLICATIONS

Title: A Technique for Monitoring Run–Time Dynamics of an Operating System and Microprocessor Executing User Application, author: Argade et al, ACM, 1994.*

Title: Instruction Issue Logic for high–performance, interruptable pipelined processors, author: Sohi et al, ACM, 1987.*

Title: An Out–of Order Superscalar Processor with Speculative Execution and Fast, Precise Interrupts, author: Dwyer et al, IEEE, 1992.*

* cited by examiner

Primary Examiner—Chameli C. Das
(74) Attorney, Agent, or Firm—Bell, Boyd & Lloyd LLC

(57) ABSTRACT

In a device containing trace control data which are stored in a data structure in a memory having memory cells and define memory areas including at least one or more adjacent memory cells, a procedure uses the trace control data taken from the data structure to ascertain the memory area and traces the data stored therein. This allows the data to be traced in a manner which is flexibly configurable during operation of the device, without retranslating the procedure.

12 Claims, 2 Drawing Sheets

SOFTWARE SYSTEM FOR TRACING DATA

BACKGROUND OF THE INVENTION

1. Field of the Invention

The present invention relates, generally, to a software system for tracing data and, more specifically, to such a system wherein the separation of trace control data from the trace procedure allows the data to be traced by the trace procedure to be stipulated very flexibly and without retranslating the trace procedure.

2. Description of the Prior Art

In a contemporary device for processing information, a multiplicity of information processing operations, also called "processes," are normally executed on the process-handling devices provided in the device; e.g., processors. In this context, a process is understood to be the operation of information processing taking place in algorithm form; i.e., in a series of individual information processing steps. Examples of processes are the editing of files or the sending of e-mails. Examples of information processing steps are opening, printing and/or storing a file or changing a memory area in the main memory.

The information processing steps are performed by a processor under the control of programs having a succession of instructions, also called "machine commands." In this context, different machine commands characterize different fundamental processing steps of the processor. Examples of fundamental processing steps are arithmetic operations; e.g., integer addition or subtraction. The program thus indicates to the processor which of its fundamental processing steps needs to be carried out in which order. To carry out the information processing steps, the programs use different components of a contemporary information processing device, depending on the type of information processing steps. These components are also called "operating parts." Examples of operating parts are printers, processors, memory space or files. To ensure that the operating parts have the best possible utilization level, the operating parts are normally used simultaneously; i.e., reciprocally or jointly. This operating mode of the device is called "multi-program operation" or "multitasking." That is, the device appears to process a number of programs simultaneously. In this context, the programs can be processed sequentially, i.e., one after the other, or in parallel, i.e., with their timing intermeshed. The intermeshed processing of a number of programs is also called "interleaving."

Since, by way of example, the simultaneous use of the operating parts can give rise to conflicts (for example, when two programs wish to output data to the same printer simultaneously or wish to have write access to the same file simultaneously), an operating system is normally provided for managing the operating parts. In this context, an operating system includes those programs which, among other things, control and monitor access to the operating parts, the order of timing for processing the programs running in the device, and maintenance of the operating mode. For the purposes of distinction, these control programs are called "operating system programs" or else "system software," and the programs using the system software to access the operating parts are called "user programs" or else "application software."

To support this division of the programs into two classes, contemporary processors normally provide two operating modes, a privileged operating mode (also called "system mode"), in which all the machine commands can be executed without limitation of their mode of action, and an unprivileged operating mode (also called "user mode"), in which a few machine commands are limited in terms of their mode of action or are prohibited. By way of example, in the unprivileged operating mode, those machine commands which are used for direct access to the device's operating parts are prohibited. Normally, the application software is executed in the user mode, and the system software in the system mode. The application software can thus access the operating parts of the device only using the system software. The user programs thus contain no program parts which, by way of example, stipulate the memory cells of a main memory in which the user programs are stored, how and where the data of the user programs are stored on background stores, e.g., hard disks, the order in which the user programs are executed or how user programs and data are protected against unauthorized access. These and other tasks, e.g., management, control or monitoring tasks, are performed by the operating system. By way of example, the following fundamental information processing steps are performed by the operating system:

reading in a character from a keyboard;

outputting a character to a screen; and reading a program into a memory.

For carrying out the fundamental information processing steps, different "operating system procedures" are provided in the operating system. In this context, procedures are machine command sequences combined to form units which can be called. These commands are generally called by the application software. In contemporary processors, an operating system procedure is normally called using a machine command which the processor uses to interrupt execution of the calling program and to branch it to the system software. The interruption is also called an "interrupt," the machine command is also called an "SVC" (Supervisor Call), and the called operating system procedure is also called an "SVC procedure." Once the called procedure has been processed completely, execution normally branches to the next machine command of the calling program; i.e., to the machine command which immediately succeeds the machine command SVC in the machine command sequence of the calling program.

In terms of opportunities for use which have the greatest possible degree of flexibility, procedures normally contain variable components, also called "formal parameters," which are usually stipulated by the calling program when the procedure is called, by indicating "call parameters." In this context, the formal parameters are replaced by the call parameters on the basis of specific rules, which are also called "parameter transfer." When the procedure has been processed, the called procedure normally transfers to the calling program "result parameters" which contain an information item determined by the task of the procedure, e.g., an order confirmation, an error message or a value calculated or ascertained by the procedure. In this context, the value of the calculated result parameters frequently depends on the values of the call parameters.

However, procedures having formal parameters are more susceptible to error than procedures without formal parameters, on account of the greater degree of flexibility. They therefore need to be tested for freedom from error with relatively great care when programs are tested. In this context, two potential sources of error are of particular significance:

(1) The values of the result parameters of the procedures are generally not defined for all possible value combinations of the call parameters. It is therefore necessary to test whether the procedures are always called with permissible value combinations of the call parameters; and (2) The procedures may have logical coding errors. It is therefore necessary to test whether the procedures deliver the desired result for each permissible combination of input values.

Thus, for the program test, i.e., searching for errors in the programs, logging of the call and result parameters of the procedures is of central importance for checking the procedures.

However, since the complexity of contemporary programs means that a full test for freedom from error is often not possible, even tested programs frequently still have errors which can arise during execution of the programs. In this context, the described central role of the operating system means that errors in the procedures of the operating system programs generally have greater consequences than errors in the user programs; e.g., failure of the device and of all the user programs running on it.

The normal method for finding errors is to log the execution of the procedures of a program using an execution tracking program; also called a "debugger." In this context, execution of the program is tracked step by step under the control of the debugger. In this case, program execution is stopped by the debugger after each step, for example, and data stored in the memory cells of the main memory, e.g., the call and result parameters, can be displayed. However, a program is generally executed without the control of a debugger, since a debugger slows down the execution time of a program significantly; e.g., by a factor of ten. In addition, errors which arise sporadically, for example, frequently no longer appear when a program is executed under the control of a debugger on account of the program being executed more slowly over time. In addition, searching for errors using a debugger requires that the erroneous program be terminated and then started together with a debugger, which results in the program being interrupted. This method is therefore unsuitable for finding errors in operating system programs, since the operating system programs normally must not be terminated and restarted on account of operation of the device usually being interrupted in conjunction with this. This is particularly undesirable in devices for connecting telephone calls.

It is therefore necessary to track the execution of a program during correct execution. This is also called "tracing" in the expert field. Normally, special machine commands are inserted into the procedures of the programs for this purpose. The machine commands specifically log particular data, normally the call and result parameters of the procedures, e.g., in a particular memory area in the main memory, or a file on the background store. The drawback of this, however, is that other data which may be additionally required for finding an error are not logged if the special machine commands contain no provision for these data to be logged. In addition, logging slows down execution of the program even when no logging is necessary. This is particularly disadvantageous in operating system procedures since slowing down the operating system slows down all the user programs managed by the operating system, even those which are executed without errors.

The technical background described above is disclosed in Engesser, Hermann [publishers]; Claus, Volker [editors]; Duden "Inforinatik" [Information Technology]; 2nd edition; Mannheim; Leipzig; Vienna; Zurich: Dudenverlag; 1993; ISBN 3-411-05232-5. See, in particular, page 8 f (Execution log, Trace), page 83 ff (Operating mode), page 86 (Operating means), page 86 ff (Operating system), page 188 (Debugger), page 457 ff (Parallel operation), page 557 ff (Procedure), page 559 ff (Processes), page 720 ff (Testing) and page 756 f (Interruption).

The present invention is thus directed toward developing a method of the type mentioned in the introduction such that the tracing of data is improved.

SUMMARY OF THE INVENTION

The present invention can, in essence, be regarded as being that a first procedure, also called trace procedure, takes a first information item, also called trace control data, from a data structure stored in the memory of a device, uses the trace control data to ascertain at least one memory area, and traces at least the data stored in the memory area. A fundamental advantage of the method according to the present invention arises from the fact that the separation of the trace control data from the trace procedure allows for the data to be traced by the trace procedure to be stipulated very flexibly and without retranslating the trace procedure. In particular, during tracing, other data additionally can be logged by extending the trace control data if, by way of example, the error search detects that the other data need to be traced for the purpose of diagnosing the error. In addition, tracing also can be stopped without interrupting operation, by virtue of the trace control data stipulating no memory areas to be traced. This is particularly advantageous in operating system procedures since, in this case, all the user programs are executed more quickly when tracing is not carried out. In addition, gradually reducing the extent of the data to be traced or selectively tracing very little data may make it possible, in the case of sporadically arising errors, to ensure that these errors continue to arise provided that the specific tracing slows down execution of the operating system procedures over time only minimally.

In accordance with one embodiment of the method according to the present invention, the memory area is defined by a statement, contained in the first information item, indicating the memory address of the first memory cell and the number of memory cells. In accordance with another embodiment of the method according to the present invention, the number of memory cells is defined by indicating the type of data stored in the memory area. Thus, the call and result parameters can be indicated in a particularly simple manner during the error search, since both the memory address of these parameters and their data type are normally known.

In accordance with another embodiment of the method according to the present invention, the memory area is defined by a statement, contained in the first information item, indicating the memory addresses of the first memory cell and the last memory cell. This advantageously allows any memory areas to be indicated. This is of particular advantage, for example, when data having different data types are stored in the memory area, and consequently one length statement per data type is not possible.

In accordance with a further development of the method according to the present invention, an operating system which operates the device and contains at least the trace procedure and a second procedure (also called SVC procedure below) calls the trace procedure instead of the SVC procedure when the SVC procedure is called. Thus, the trace procedure is advantageously executed even though the caller has called the SVC procedure. As such, the calling program need not be altered, which advantageously eliminates retranslation of the calling program, which is normally necessary for this purpose. This is particularly advantageous when the calling program cannot be translated; for example, on account of program source files being unavailable.

In accordance with another embodiment of the method according to the present invention, the SVC procedure is called by the trace procedure. As such, the service prompted by the SVC procedure is advantageously provided even when there is a branch to the trace procedure.

In accordance with yet another embodiment of the method according to the present invention, at least the data stored in the memory area are traced on the basis of a second information item, likewise called trace control data below, which is contained in the data structure and defines the instant of tracing of the memory area, before and/or after the second procedure is called. The extent of the data which are to be traced can be controlled as required. Thus, by way of example, the call parameters transferred by the program which actually calls the SVC procedure are of interest only before the call, and the result parameters formed by the SVC procedure are of interest only after the SVC procedure is called.

In accordance with one embodiment of the method according to the present invention, the device is controlled by the operating system such that the data structure can be accessed only by the operating system. Accordingly, the user software can alter the trace control data neither unintentionally, e.g., as a result of a program error in the user software, nor intentionally, e.g., in order to modify the operating system via a computer virus.

In accordance with another embodiment of the method according to the present invention, the trace control data are modified by the operating system on the basis of a control information item. This is advantageous because it is frequently only during the error analysis that it becomes obvious which data are to be traced at what time.

In accordance with a further embodiment of the method according to the present invention, the operating system makes a setting, on the basis of a further control information item, such that the trace procedure is called instead of the SVC procedure when the SVC procedure is called. This allows selective setting of whether or not the SVC procedure is to be traced. If tracing is deactivated, the processing speed of the operating system is increased on account of the fact that tracing does not take place.

In accordance with yet another embodiment of the method according to the present invention, the modifications made by the operating system are made during operation of the device. As such, at any instant during operation of the device, the error search can be set, flexibly according to requirements, to specify which data are traced by which procedure of the operating system.

Additional features and advantages of the present invention are described in, and will become apparent from, the following detailed description of the preferred embodiments and the drawings.

DETAILED DESCRIPTION OF THE PREFERRED EMBODIMENTS

Figure 1:
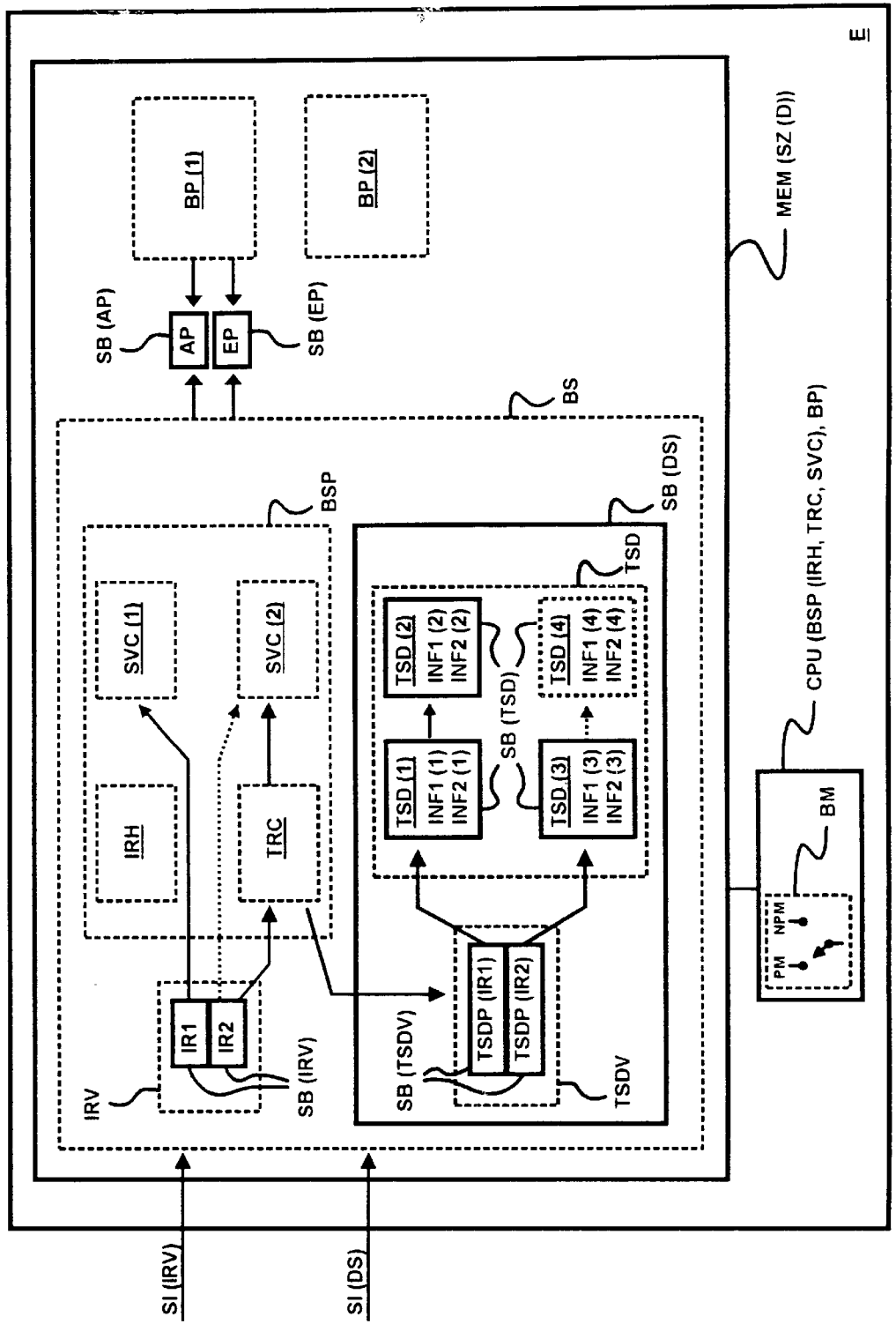
FIG. 1 shows a block diagram of a contemporary device in which the method according to the present invention is executed.

FIG. 1 shows, by way of illustration, an information processing device E which contains at least process-handling apparatuses and a memory. The process-handling apparatuses are in the form of a processor CPU and the memory is in the form of a RAM store MEM. The processor CPU and the memory MEM are connected to one another. The memory MEM stores data D in memory areas SB formed from one or more adjacent memory cells SZ.

The operation of the device E is controlled by an operating system BS stored in the memory MEM. In this context, the operating system BS includes:

(1) a number of operating system procedures BSP;
(2) an interrupt vector IRV; and
(3) a data structure DS.

The operating system procedures BSP provided are an interrupt handler IRH, a trace procedure TRC and also a first SVC procedure SVC (1) and a second SVC procedure SVC (2). The interrupt vector IRV is provided for managing the operating system procedures BSP internally in the operating system and contains a first procedure reference IR1 to the operating system procedure SVC (1) and a second procedure reference IR2 to the trace procedure TRC. The data structure DS stores a trace control data vector TSDV and trace control data TSD. In this context, the trace control data vector TSDV is provided for managing the trace control data TSD internally in the operating system. Storage in the data structure DS advantageously separates the trace control data TSD from the trace procedure TRC. To connect the trace control data TSD to the trace procedure TRC, the trace procedure TRC makes reference to the trace control data vector TSDV managing the trace control data TSD. The trace control data vector TSDV contains a first trace control data reference TSDP (IR1) and a second trace control data reference TSDP (IR2). The first trace control data reference TSDP (IR1) makes reference to first trace control data TSD (1), which in turn make reference to second trace control data TSD (2). The second trace control data reference TSDP (IR2) makes reference to third trace control data TSD (3). The trace control data TSD are stored in the memory areas SB (TSD). They contain, by way of example, a respective first information item INF1 and a respective second information item INF2 and also, possibly, a reference to further trace control data TSD. The succession of references which proceeds from the trace control data reference TSDV (IR1) makes reference to those trace control data TSD which stipulate which data D are to be traced during the tracing of the operating system procedure SVC (1). In a similar way, the succession of references which proceeds from the trace control data reference TSDV (IR2) makes reference to those trace control data TSD which stipulate which data D are to be traced during the tracing of the operating system procedure SVC (2).

The process handling is controlled by the operating system procedures BSP and/or user programs BP stored in the memory MEM. The user programs BP indicated are a first user program BP (1) and a second user program BP (2). In this context, the operating mode BM of the processor CPU is set to an unprivileged operating mode NPM during execution of the user procedures BP, and to a privileged operating mode PM during execution of the operating system procedures BSP. This precludes access by the user programs BP to the data structure DS, since the data structure DS is associated with the operating system BS and can be accessed only in the privileged operating mode PM. In addition, the memory MEM stores call parameters AP and result parameters EP which the operating system BS and the user program BP (1) can access.

Figure 2:
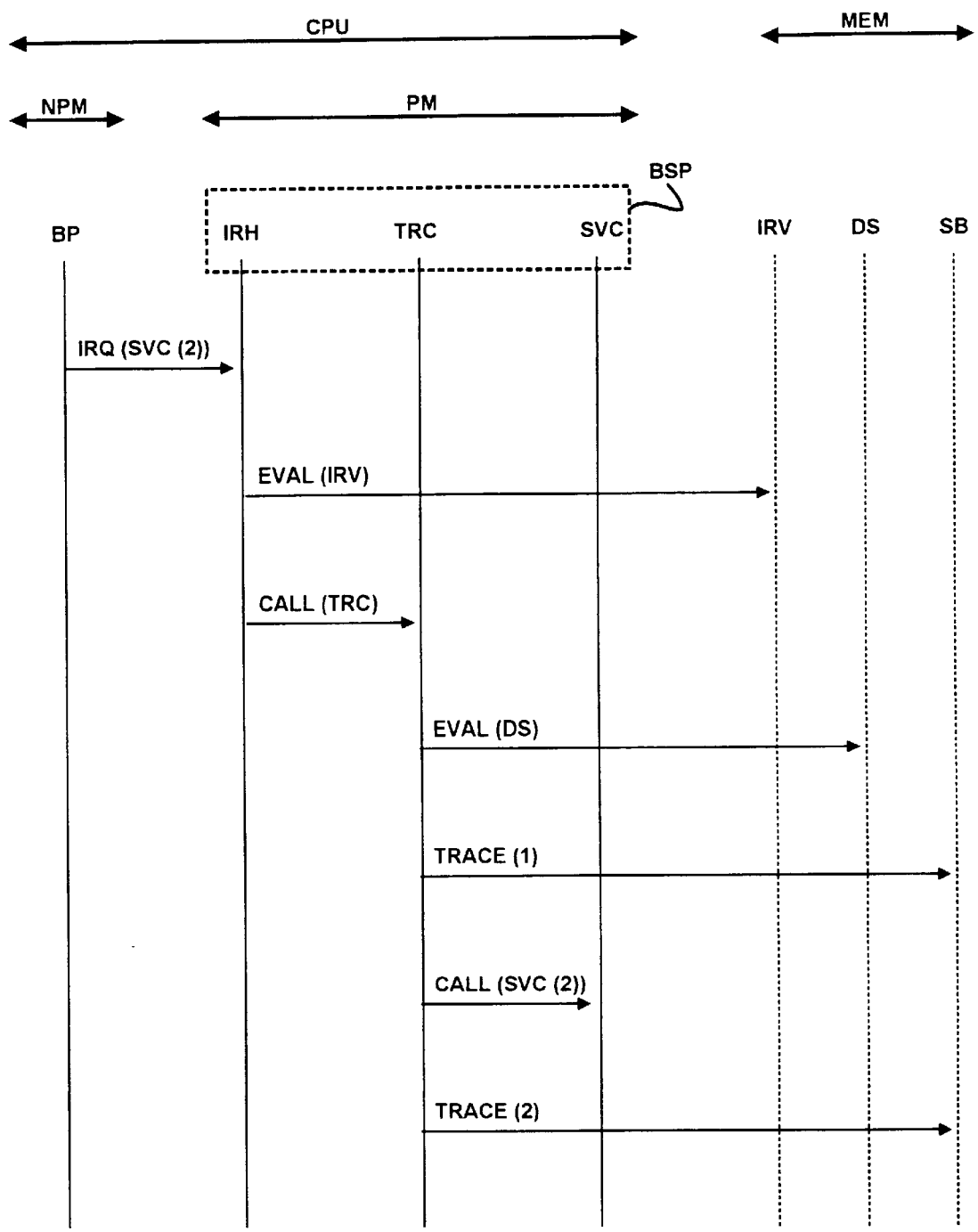
FIG. 2 shows a flowchart for execution of a trace method according to the present invention.

FIG. 2 shows, by way of illustration, calling of the trace procedure TRC, with the access operations to data D in the memory MEM which take place in the process. In this context, four execution sequences are provided which represent execution of the user programs BP and of three operating system procedures BSP—the interrupt handler IRH, the trace procedure TRC and the SVC procedure SVC. In this context, the operating system procedures BSP represent parts of the operating system BS and are processed by the processor CPU in the privileged operating mode PM, while the user programs BP are executed in the unprivileged operating mode NPM. The data D which are accessed by the programs and are stored in the memory MEM are represented by three dashed lines representing the data structure DS, the interrupt vector IRV and memory areas SB. The dashed illustration indicates that the data are used only by the programs, but themselves contain no program parts executing the method according to the present invention.

For the exemplary embodiment, it is assumed that the user program BP (1) calls the SVC procedure SVC (2). In this context, call parameters AP are transferred to the operating system BS by storing the call parameters in the memory area SB (AP). The call is made by the machine command Interrupt Request IRQ (SVC (2)), which indicates that the SVC procedure SVC (2) is to be executed. As a result of the interrupt request IRQ (SVC (2)), the processor CPU interrupts execution of the user program BP (1) and processes the interrupt handler IRH instead. In this context, the operating mode of the processor is changed over from an unprivileged operating mode NPM to a privileged operating mode PM. The interrupt handler IRH accesses the interrupt vector IRV, which is stored at a permanently prescribed location in the operating system BS. In this context, the operating system BS may be configured, using control information SI (IRV), such that every call for the SVC procedure SVC (2) is traced. For this purpose, the procedure reference IR2 in the interrupt vector IRV makes reference not to the SVC procedure SVC (2), but rather to the trace procedure TRC. After evaluation of the interrupt reference IR2, which is done using evaluation commands EVAL (IRV), the interrupt handler IRH uses call commands CALL (TRC) to call the trace procedure TRC instead of the SVC procedure SVC (2) called originally.

When it has been called, the trace procedure TRC accesses the data structure DS and takes the trace control data TSD (3). The data structure DS is accessed using evaluation commands EVAL (DS). In this context, the information items INF1 (3) and INF2 (3) are taken from the trace control data TSD (3). In this case, the trace control data TSD (3) may be configured, using control information SI (DS), such that the first information item INF1 (3) contained characterizes the memory area SB (AP) in which the call parameters AP are stored, and the second information item INF2 (3) stipulates that the tracing of the memory area SB (AP) is to take place before the SVC procedure SVC (2) is called. The trace procedure TRC then traces the call parameters AP stored in the memory area SB (AP) using the trace commands TRACE (1). The trace procedure TRC then calls the SVC procedure SVC (2) using call commands CALL (SVC 2)). While the SVC procedure SVC (2) is being processed, the result parameters EP are stored in the memory area SB (EP). After the end of processing of the SVC procedure SVC (2), processing of the trace procedure TRC is continued. Since the data structure DS stores no further relevant trace control data TSD, there is no further tracing of data. Hence, processing within the operating system BS has finished and processing of the user program BP (1) is continued. In this context, the operating mode of the processor CPU is normally changed back over from the privileged operating mode PM to the unprivileged operating mode PM.

If, during this tracing of the SVC procedure during operation of the device E, it is detected that the result parameters EP likewise need to be traced, the data structure DS is extended, by inputting control information SI (DS), by further trace control data TSD (4) which contain a first information item INF1 (4) and a second information item INF2 (4). In this context, the first information item INF1 (4) characterizes the memory area SB (EP) in which the result parameters EP are stored, and the second information item INF2 (4) stipulates that the tracing of the memory area SB (AP) is to take place after the SVC procedure SVC (2) is called. If the result parameters are represented by a value of the data type INTEGER, for example, the memory area SP (EP) is stipulated by indicating the memory address of the first memory cell SZ in the memory area SP (EP) and indicating the data type INTEGER. Alternatively, it may be stipulated by indicating the first and the last memory cell in a memory area SB. By way of example, the trace control data TSD may need to be traced in order to test the trace procedure. To this end, the entire memory area SB (DS) in which the trace control data TSD are normally stored is traced. The memory area SB (DS) is stipulated by indicating the first and the last memory cell SZ in the memory cells SZ provided for the memory area SB (DS). Pursuant to this modification, whenever the SVC procedure SVC (2) is called again, the trace procedure TRC traces the result parameters EP using the trace commands TRACE (2) before processing of the calling user program BP is continued.

Finally, it should be noted that the data structure DS is modified, and this modification is effective immediately, during operation of the device E and without interrupting the operating system program BSP or the user program BP.

Although the present invention has been described with reference to specific embodiments, those with school in the art will recognize that changes may be made in thereto without departing from the spirit and scope of the invention as set forth in the hereafter appended claims.

What is claimed is:

1. A software system for tracing data, comprising:
   an interrupt-controlled call interface which includes a modifiable interrupt vector;
   at least one system program which is called via the interrupt-controlled call interface; and
   at least one trace program for tracing the data;
   wherein the modifiable interrupt vector includes a procedure reference, associated with the system program, in a main memory which can be modified to contain a reference to one of the system program and the trace program such that, when an interrupt occurs which relates to the system program, execution then branches to one of the system program and the trace program based on a current value of the procedure reference.

2. A software system for tracing data as claimed in claim 1, further comprising:
   a control information item, wherein the procedure reference is formed and modified based on the control information item.

3. A software system for tracing data as claimed in claim 1, wherein at least one call for the system program is provided in the trace program.

4. A software system for tracing data as claimed in claim 1, further comprising:
   trace control data stored separately from the trace program, wherein the trace program uses the trace control data to ascertain the data to be traced.

5. A software system for tracing data as claimed in claim 4, wherein the trace control data includes first information which defines at least one memory area, the memory area having at least one adjacent memory cell of a memory and storing the data to be traced by the trace program.

6. A software system for tracing data as claimed in claim 5, wherein the trace control data includes second information which defines an instant at which the data are traced.

7. A software system for tracing data as claimed in claim 6, wherein the instant is situated at least one of before and after the system program is called.

8. A software system for tracing data as claimed in claim 7, further comprising:
   a further control information item, wherein the trace control data can be modified based on the further control information item.

9. An operating system comprising a software system for tracing data, which includes an interrupt-controlled call interface having a modifiable interrupt vector, at least one system program which is called via the interrupt-controlled call interface, and at least one trace program for tracing the data, wherein the modifiable interrupt vector includes a procedure reference, associated with the system program, in a main memory which can be modified to contain a reference to one of the system program and the trace program such that, when an interrupt occurs which relates to the system program, execution then branches to one of the system program and the trace program based on a current value of the procedure reference.

10. An operating system as claimed in claim 9, wherein the modifications are made during operation of the operating system.

11. A device comprising a software system for tracing data, comprising an interrupt-controlled call interface which includes a modifiable interrupt vector, at least one system program which is called via the interrupt-controlled call interface, and at least one trace program for tracing the data, wherein the modifiable interrupt vector includes a procedure reference, associated with the system program, in a main memory which can be modified to contain a reference to one of the system program and the trace program such that, when an interrupt occurs which relates to the system program, execution then branches to one of the system program and the trace program based on a current value of the procedure reference.

12. A device is claimed in claim 11, wherein the modifications are made during operation of the device.

\* \* \* \* \*